United States Patent
Ikemori

4,110,006
Aug. 29, 1978

[54] TELEPHOTO TYPE ZOOM LENS

[75] Inventor: Keiji Ikemori, Yokohama, Japan

[73] Assignee: Canon Kabushiki Kaisha, Tokyo, Japan

[21] Appl. No.: 773,667

[22] Filed: Mar. 2, 1977

[30] Foreign Application Priority Data

Mar. 11, 1976 [JP] Japan .................. 51/26580

[51] Int. Cl.² .............................. G02B 15/18
[52] U.S. Cl. .................... 350/186; 350/187; 350/212
[58] Field of Search ............ 350/186, 184, 212

[56] References Cited

U.S. PATENT DOCUMENTS

| | | | |
|---|---|---|---|
| 3,594,066 | 7/1971 | Cook et al. | 350/186 |
| 3,598,476 | 8/1971 | Merigold | 350/186 |
| 3,632,188 | 1/1972 | Nakamura | 350/186 |
| 3,682,534 | 8/1972 | Cook et al. | 350/186 |

*Primary Examiner*—Conrad J. Clark
*Attorney, Agent, or Firm*—Toren, McGeady and Stanger

[57] ABSTRACT

The present invention relates to a focusing lens group of a telephoto zoom lens having a long range of focal length. The focusing lens group consists of four sub-groups, wherein first, second, and fourth sub-groups are fixed while a third sub-group can be shifted for focusing. The first sub-group has a positive refractive power and the second sub-group has a negative refractive power. The third sub-group has a positive refractive power and the fourth sub-group has a negative refractive power. As a result, the variation in the image quality at a time when the telephoto zoom lens is focused will be eliminated and the diameters of the lenses in the second, third and fourth sub-groups will be smaller than that of the first sub-group.

12 Claims, 99 Drawing Figures

FIG.2A  FIG.2B  FIG.2C
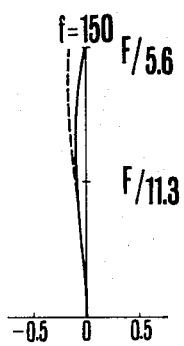 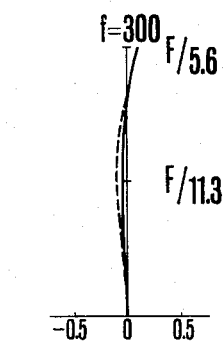 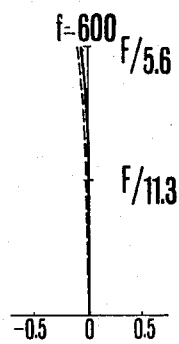
SPHERICAL ABERRATION AND SINE CONDITION
FIG.2D  FIG.2E  FIG.2F
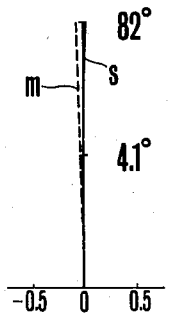 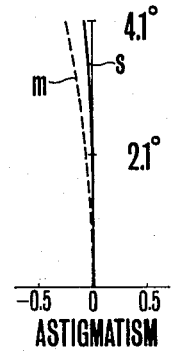 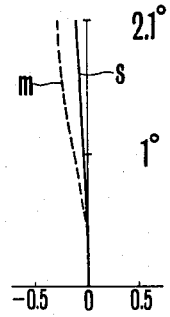
ASTIGMATISM
FIG.2G  FIG.2H  FIG.2I
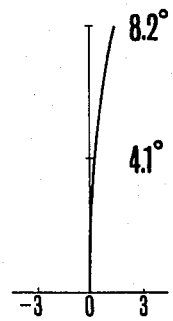 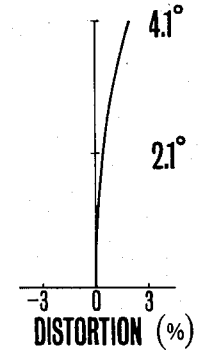 
DISTORTION (%)
FIG.2J  FIG.2K  FIG.2L
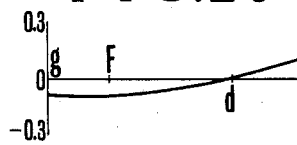 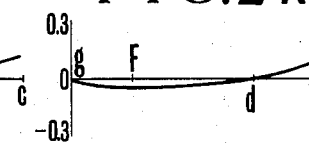 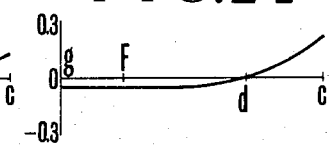
CHROMATIC ABERRATION ON AXIS

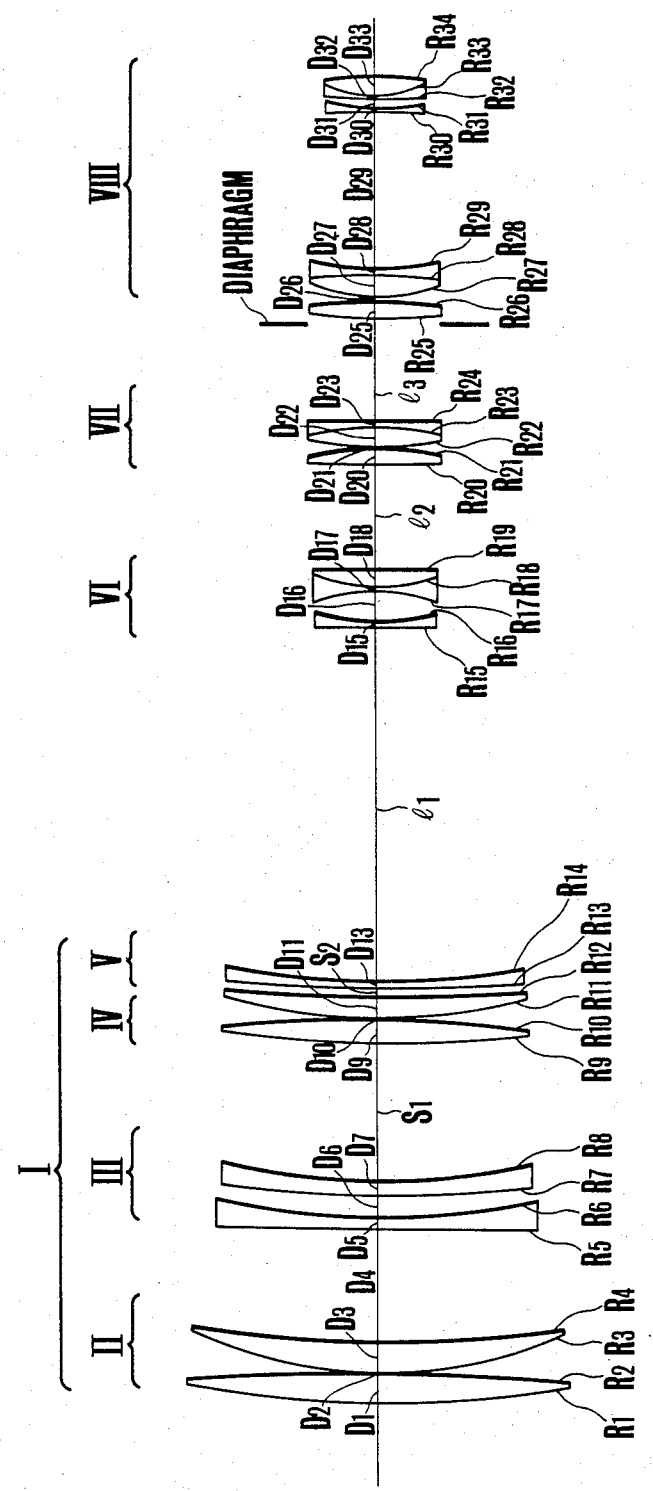
F I G.3 f=150 F/5.6
F/11.3 f=300 F/5.6
F/11.3
SPHERICAL ABERRATION
AND SINE CONDITION f=600 F/5.6
F/11.3

8.2°
4.1°

4.1°
2.1°
ASTIGMATISM 2.1°
1°

8.2°
4.1°

4.1°
2.1°
DISTORTION (%)

2.1°
1°

CHROMATIC ABERRATION ON AXIS f=150 F/5.6
F/11.3 f=300 F/5.6
F/11.3 f=600 F/5.6
F/11.3

SPHERICAL ABERRATION AND SINE CONDITION

738mm (OBJECT HEIGHT)
373

372
188

187
95

ASTIGMATISM 738
373

372
188

187
95

DISTORTION (%)

CHROMATIC ABERRATION ON AXIS f=150 F/5.6 F/11.3 f=300 F/5.6 F/11.3
SPHERICAL ABERRATION AND SINE CONDITION f=600 F/5.6 F/11.3

311mm (OBJECT HEIGHT) 158

157 80
ASTIGMATISM 79 40

311 158

157 80
DISTORTION (%)

79 40

CHROMATIC ABERRATION ON AXIS

SPHERICAL ABERRATION AND SINE CONDITION

ASTIGMATISM

DISTORTION (%)

CHROMATIC ABERRATION ON AXIS

FIG.9A  FIG.9B  FIG.9C
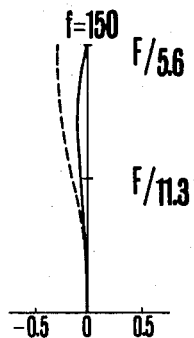 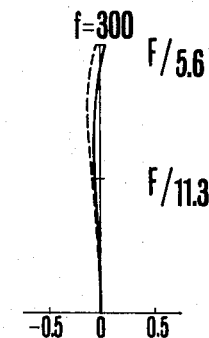 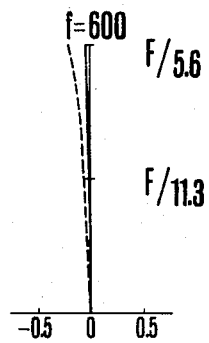
SPHERICAL ABERRATION
AND SINE CONDITION
FIG.9D  FIG.9E  FIG.9F
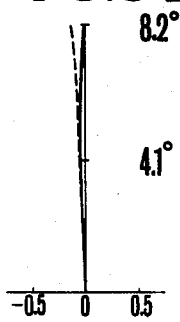 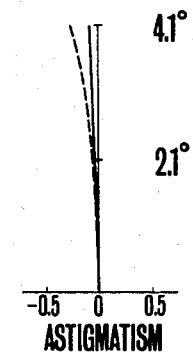 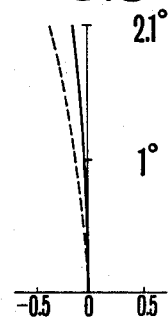
ASTIGMATISM
FIG.9G  FIG.9H  FIG.9I
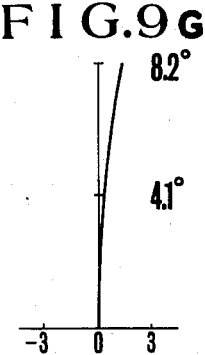 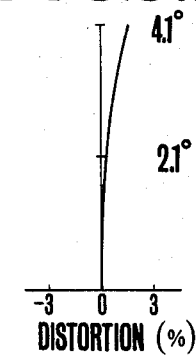 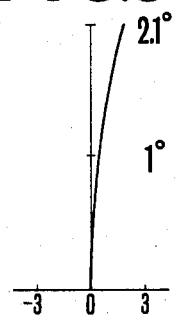
DISTORTION (%)
FIG.9J  FIG.9K  FIG.9L
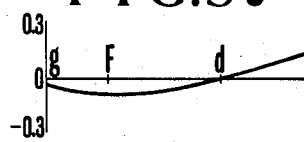 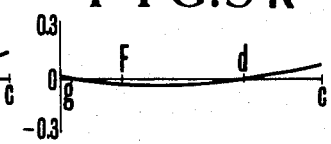 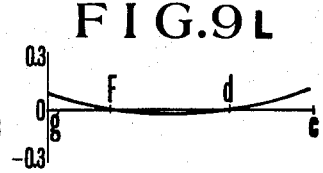
CHROMATIC ABERRATION ON AXIS f=150 F/5.6
F/11.3 f=300 F/5.6
F/11.3

SPHERICAL ABERRATION AND SINE CONDITION f=600 F/5.6
F/11.3

8.2°
4.1°

4.1°
2.1°

ASTIGMATISM 2.1°
1°

8.2°
4.1°

4.1°
2.1°

DISTORTION (%)

2.1°
1°

CHROMATIC ABERRATION AXIS

FIG.11A  FIG.11B  FIG.11C
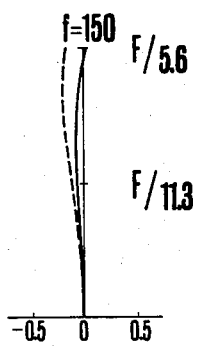 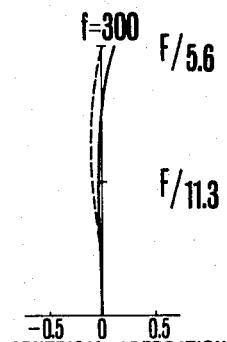 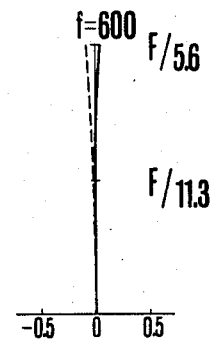
SPHERICAL ABERRATION
AND SINE CONDITION
FIG.11D  FIG.11E  FIG.11F
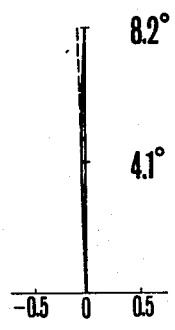 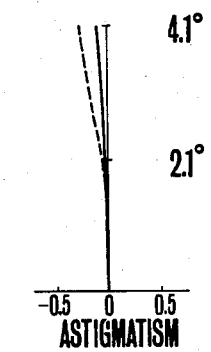 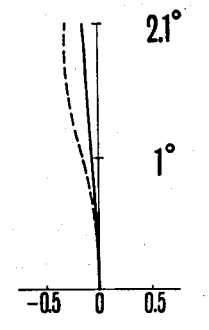
ASTIGMATISM
FIG.11G  FIG.11H  FIG.11I
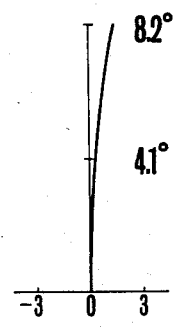 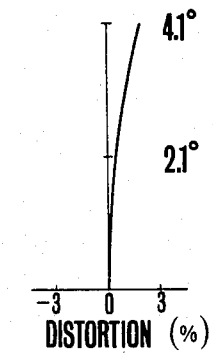 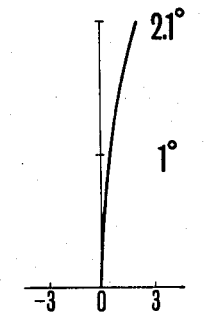
DISTORTION (%)
FIG.11J  FIG.11K  FIG.11L
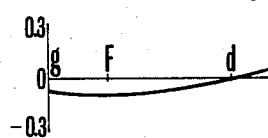 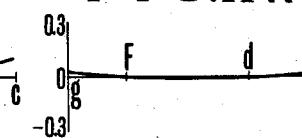 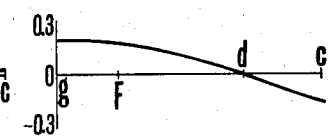
CHROMATIC ABERRATION ON AXIS

TELEPHOTO TYPE ZOOM LENS

BACKGROUND OF THE INVENTION

The present invention relates to a zoom lens and particularly to an optical system suitable to a so-called telephoto type zoom lens having an angle of view at the wide angle end which is smaller than 40°.

If the focal length at the telescopic end is quite long and the diameter is large, a lens diameter (front lens diameter) at the front end of the object side will be considerably large. Therefore, when a conventionally known focusing system in which an entire focusing group is shifted is employed, the weight of the total focusing lens will become very heavy, and a warp will be generated in the lens barrel while the lens is shifted Thus, deterioration of properties will occur by eccentricity of optic axis, and the barrel wall thickness of the lens barrel must be thick for preventing the same. Accordingly, the total system becomes large and heavy, and its handling characteristics become poor.

On the other hand, a focusing lens having a number of lenses reduced is known in U.S. Pat. Nos. 3,594,066 and 3,598,476. Such zoom lens is suitable to a wide angle photographing.

SUMMARY OF THE INVENTION

It is an object of the present invention to reduce lens diameters in a movable lens group and a lens group behind the group within the front lens group and at a same time to reduce the weight of the movable lens group. This will prevent the front lens group from being large and heavy weight. This occurs when a zoom lens is made suitable for telescopic purpose as such conventionally known focusing system that a portion of a convergent front lens group which is placed at a position closer to an object than a lens group being shifted for zooming is shifted, is employed. As a result, an entire lens system-containing lens barrel is made light and compact and the handling characteristic is also improved.

A particular arrangement of the present invention shall be explained. That is, in a zoom lens in which a convergent front lens group having a focusing function is provided at a position closer to an object than that of a movable lens group (a variator, a compensator) for zooming, the convergent front lens group (I) has a convergent lens group (II), a divergent lens group (III), a convergent movable lens group (IV), and a divergent rear lens group (V) in said order from an object side, and the ratio between the focal length of the convergent lens group (II) and the absolute value of the focal length of the divergent lens group (III) lies between 1 : 0.65 and 1 : 0.9, while the absolute value of the focal length of the divergent rear lens group (V) is greater than the focal length of the convergent movable lens group (IV). Focusing is done against different object distances by shifting the convergent movable lens group (IV) on an optic axis. Also it is desired that an almost afocal system is made of the convergent lens group (II) and the divergent lens group (III), that is to be specific, it is desired that a combined focal length of the convergent lens group (II) and the diverging lens group (III) is greater than ten times the focal length of the convergent lens group (I) in a state where focusing is done at an infinite object distance.

Further in an embodiment of this arrangement, the convergent lens group (II) consists of positive lenses only, at least one of which is made of fluorosilicate crown glass or fluorospar, while the divergent lens group (III) is made of negative lenses only, at least one of which is made of dense lanthanum flint glass or lanthanum flint glass. The convergent movable lens group (IV) consists of positive lenses only, at least one of which is made of fluorosilicate crown glass or fluorspar.

To explain the same in detail, it is desired that each of the convergent lens group (II) and the convergent movable lens group (IV) uses a biconvex lens and a meniscus positive lens having its convex plane facing to an object side, being positioned from an object side in said order and using fluorosilicate crown glass or fluorspar, and the divergent lens group (III) has two meniscus negative lenses having its convex plane facing the object side, using dense lanthanum flint glass or lanthanum flint glass, while the divergent rear lens group (V) uses a meniscus negative lens having its convex plane facing the object side wherein the absolute value of the focal length of the divergent rear lens group (V) is greater than five times of the focal length of the convergent movable lens group (IV) and is smaller than seven times the same.

As a result of the above arrangement, a lens group having an effective diameter considerably smaller than the minimum effective diameter $H_A$ (the focal length at a telescopic end ÷ F number) needed by the diameter of a lens at front end at an object side (front lens diameter) becomes a focusing lens group, within a convergent front lens group having a focusing function, even if the focal length at the telescopic end is very long and the lens diameter is great.

BRIEF DESCRIPTION OF THE DRAWINGS

FIG. 2A to FIG. 2C are diagrams to show spherical aberration and sine condition at a time when the zoom lens of Example 1 is focused at infinity. FIG. 2D to FIG. 2F are diagrams to show astigmatism. FIG. 2G to FIG. 2I are diagrams to show distortion. FIG. 2J to FIG. 2L are diagrams to show axial chromatic aberration.

FIG. 3 is a cross-sectional view of a lens to show Example 2.

FIG. 9A to FIG. 9L are diagrams to show aberrations at a time when the zoom lens of Example 4 is focused at infinity.

FIG. 11A to FIG. 11L are diagrams to show aberrations at a time when the zoom lens of Example 6 is focused at infinity.

DESCRIPTION OF THE PREFERRED EMBODIMENTS

Figure 1:
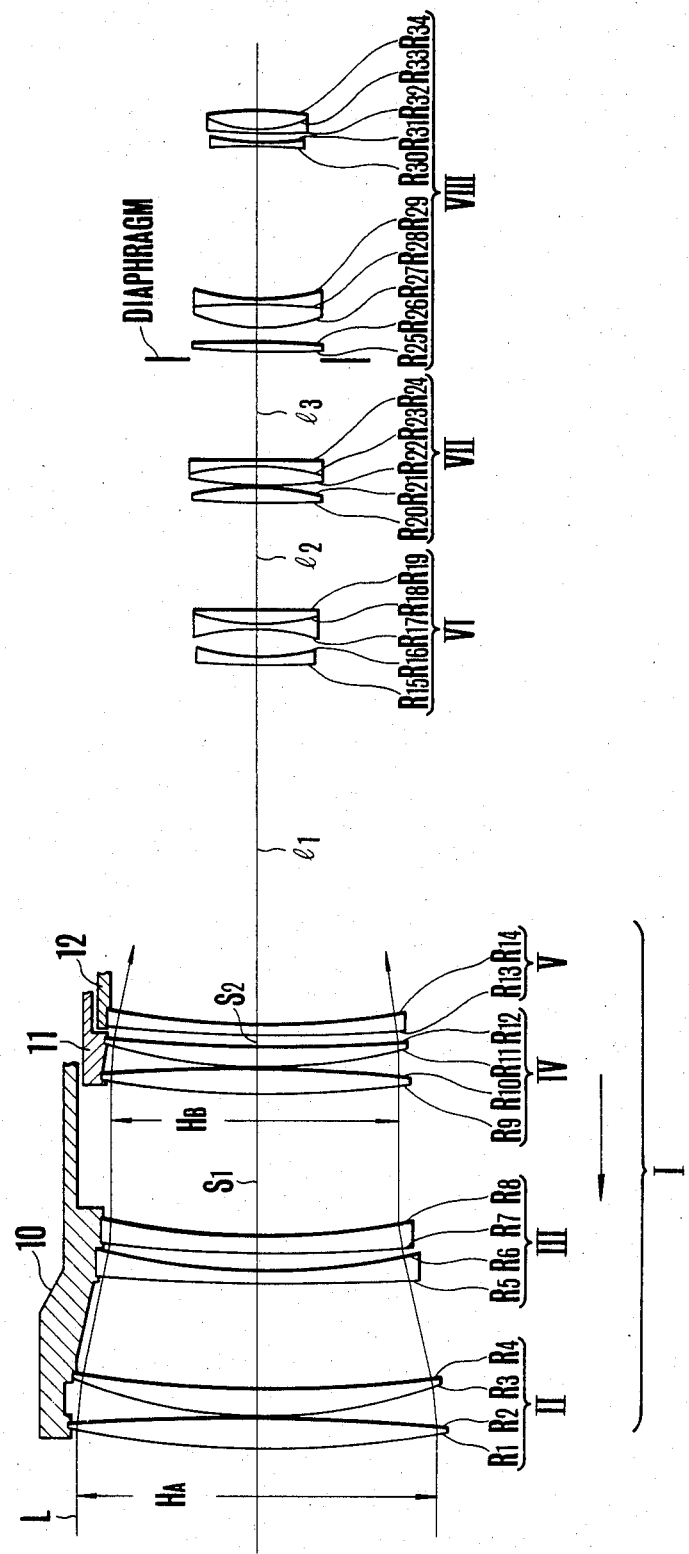
FIG. 1 is a cross sectional view of a lens, showing Example 1.
Figure 4:
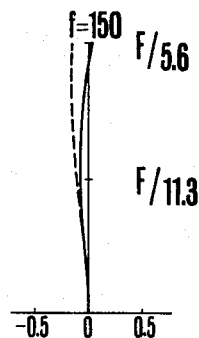
FIG. 4A to FIG. 4L are diagrams to show aberrations at a time when the zoom lens of Example 2 is focused at infinity.
Figure 4:
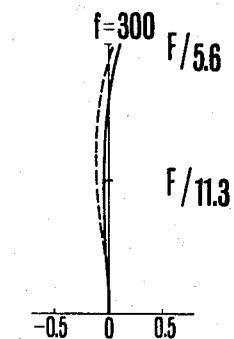
Figure 4:
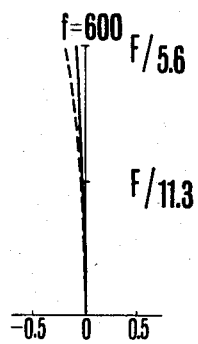
Figure 4:
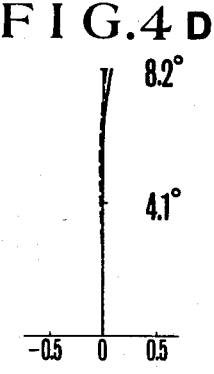
Figure 4:
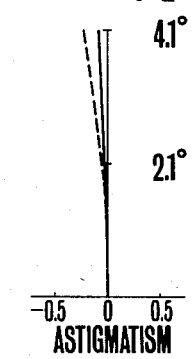
Figure 4:
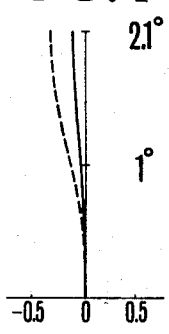
Figure 4:
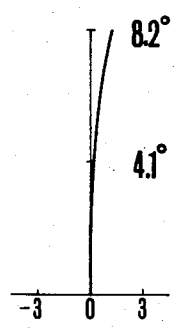
Figure 4:
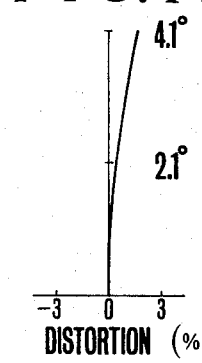
Figure 4:
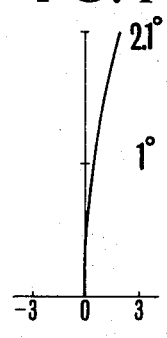
Figure 4:
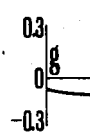
Figure 4:
Figure 4:
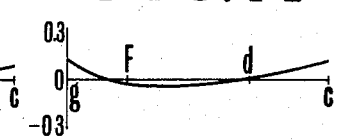
Figure 5:
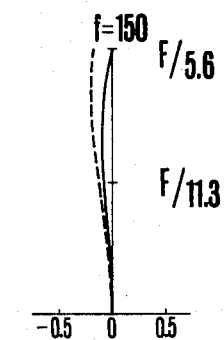
FIG. 5A to FIG. 5L are diagrams to show aberrations at a time when the zoom lens of Example 2 is focused at an object at a distance of 6 m.
Figure 5:
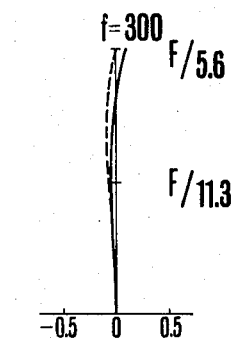
Figure 5:
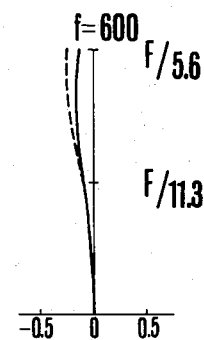
Figure 5:
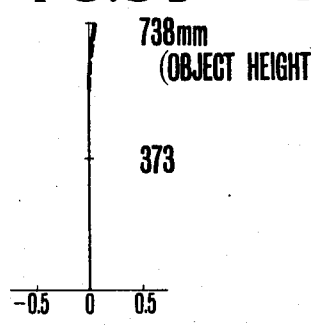
Figure 5:
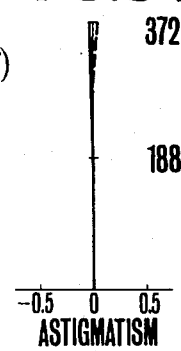
Figure 5:
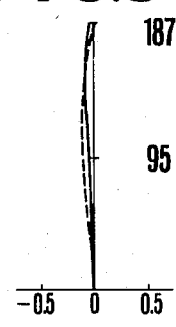
Figure 5:
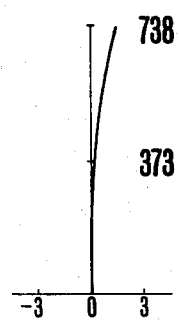
Figure 5:
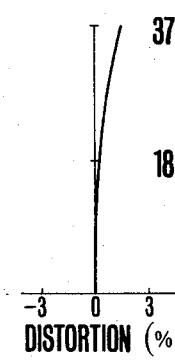
Figure 5:
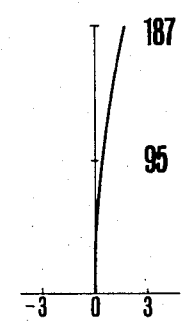
Figure 5:
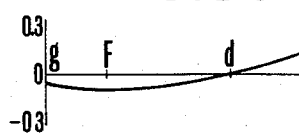
Figure 5:
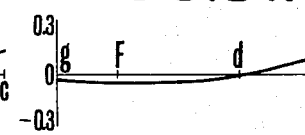
Figure 5:
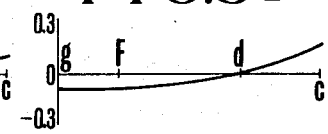
Figure 6A:
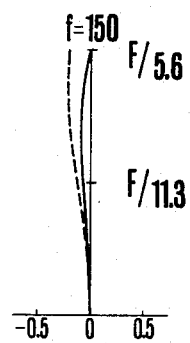
FIG. 6A to FIG. 6L are diagrams to show aberrations at a time when the zoom lens of Example 2 is focused at an object at a distance of 3 m.
Figure 6B:
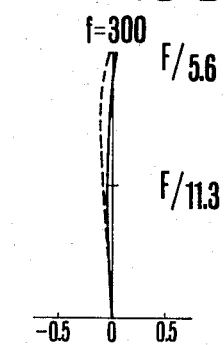
Figure 6C:
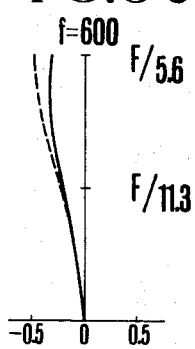
Figure 6D:
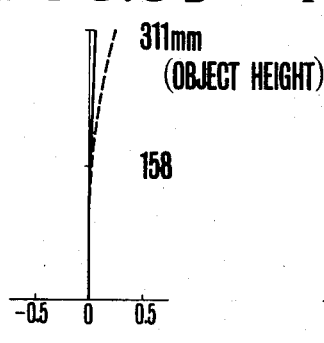
Figure 6E:
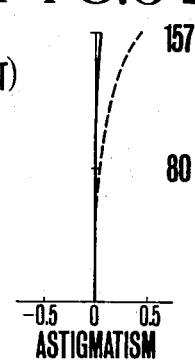
Figure 6F:
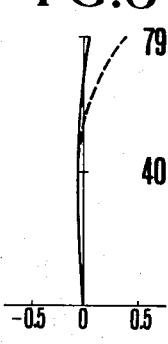
Figure 6G:
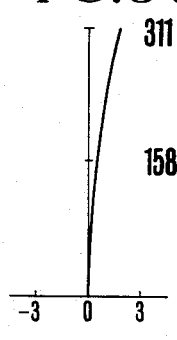
Figure 6H:
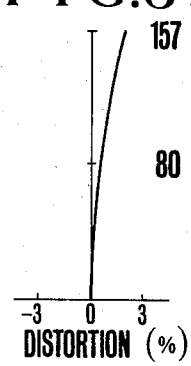
Figure 6I:
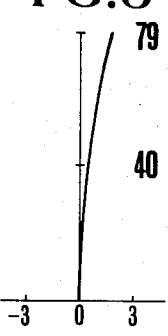
Figure 6J:
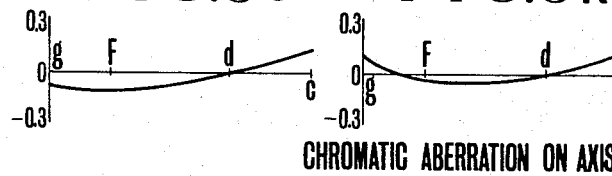
Figure 6K:
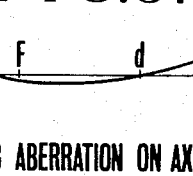
Figure 6L:
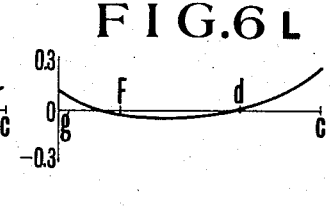

Now, FIG. 1 is a cross sectional view to show an example of the present invention, wherein I is a convergent front lens group, II is a convergent lens group, III is a divergent lens group, IV is a convergent movable lens groups, and V is a divergent rear lens group. Also, VI is a variator, VII is a compensator, VIII is an imaging lens group, 10 and 12 show a portion of a lens barrel fixed to a camera main body, 11 is a lens barrel which is shifted at a time of focusing, and L is an optical ray on an axis at a time when the total system is placed at the telescopic end.

When the focal lengths of the convergent lens group (II) and the divergent lens group (III) respectively are represented by $f_{II}$, $f_{III}$, and the distance between principal points is expressed by E, then an afocal system is made therewith, the minimum effective diameter $H_B$ required for the focusing convergent lens group will be expressed by the following formula.

$$H_B = |f_{III}|/f_{II} \times H_A$$

Therefore, $H_A$ can be made smaller than $H_B$ by so selecting the values of $f_{III}$ and $f_{II}$ as making $|f_{III}|/f_{II}$ smaller than 1. Also in a telephoto type zoom lens, the effective diameter of the convergent front lens group (I) having a focusing function is almost determined by the maximum F number luminous flux at a telescopic end position. Therefore a shifting lens barrel 11, which holds the focusing convergent lens group (III), can be provided at inside of the lens barrel 10 which holds the convergent lens group (II) and the divergent lens group (III) as shown in FIG. 1 and as detailedly shown in FIG. 3, thus the diameter of the lens barrel 10 does not have to be made large beforehand. The outer diameter of the lens barrel 10 is considerably smaller than that of a conventionally known conventional zoom lens in which the diameter of the convergent lens group for focusing is about the same as that of other lens groups, thus reduction in weight and simplification of the same can be made, while the shifting lens barrel 11 can have its weight reduced and can be simplified since the convergent lens group for focusing is of small size and light weight. Also in FIG. 7, the outer lens barrel 10 is combined with the inner lens barrel 12, and a pin 13 planted on the shifting lens barrel 11 engages with a straight line cam groove 10a at an optic axis direction cut in the lens barrel 10 and with a cam groove 15a cut in a cam ring 15 fixed at a focus ring 14. Therefore as the focus ring 14 is rotated, the convergent movable lens group IV is shifted on the optic axis X. Also, what is shown as 16 is a zoom ring while 17 is a cam ring for zooming.

Therefore, when $|f_{III}|/f_{II}$ is made greater than 0.9, $H_B$ becomes large, that is, the effective diameter of the convergent lens group (IV) for focusing becomes large, and the shifting lens barrel 11 can not be provided simply at inside of the fixed outer lens barrel 10. It becomes larger than the lens barrel supporting the front lens and reduction in weight and simplification can not be secured.

Also, when the same is made smaller than 0.65, $H_B$ becomes small, but the above mentioned distance E between principal points becomes long, that is the air gap between the convergent lens group (II) and the divergent lens group (III) becomes too long, increasing unnecessarily the total length of the lens, also since the front lens diameter is determined by the oblique luminous flux with the maximum angle of field, the effective diameter of the front lens becomes considerably larger than $H_A$. Thus, the front lens diameter becomes unnecessarily large, resulting in large size and heavy weight of the total system. In this case, since the formula $E = (H_A - H_B) \times f_1$ is satisfied, when $H_A$ and $f_1$ are made constant and $H_B$ is made small, E becomes large.

Next, to keep the absolute value of the compound focal length $f_{II \cdot III}$ of the convergent lens group (II) and the divergent lens group (III) larger than $10f_1$ when the focal length of the convergent front lens group (I) in such lens position as focusing is made at infinite is expressed by $f_1$. That is, the maintenance of an approximate afocal system is important in reducing the variation is aberration by focusing and in satisfactorily maintaining the properties of picture image from an infinite to a close up distance.

Also, while the divergent rear lens group (V) is not directly related with varying an object distance, it is necessary in satisfactorily maintaining the balancing of aberrations in the total convergent front lens group and in keeping the properties of the entire lens at very high level including the amount of aberrations generated by the lens group at object side than the rear lens group. This is also very useful in reducing the number of lenses as an additional effect as the aberrations do not have to be corrected only by the lens groups in front of the divergent rear lens group (V).

The control of the amount of shifting to a close-up distance becomes possible by suitably selecting the focal length of the divergent rear lens group (V), and it becomes easy to satisfactorily maintain the balancing of aberrations from an infinite to a close up distance.

At this time, at least, it is better to satisfy the inequality, $|f_V| > f_{IV}$, wherein $f_{IV}$ is a focal length of the convergent movable lens group (IV), while $f_V$ is a focal length of the divergent rear lens group (V).

|  | Example 1 | Example 2 | Example 3 | Example 4 | Example 5 | Example 6 |
|---|---|---|---|---|---|---|
| $\|f_{III}\|/f_{II}$ | 0.767 | 0.766 | 0.8 | 0.779 | 0.845 | 0.752 |
| $\|f_{II \cdot III}\|/f_I$ | (−)13.4 | (−)16.96 | ∞ | (−)18.04 | (+)15.32 | (−)12.89 |
| $\|f_V\|/f_{IV}$ | 5.829 | 5.756 | 6.12 | 5.756 | 5.304 | 6.09 |

Now, explanations will be made on the aberration correction function of the front lens group.

Here, for benefit of simplicity, when a lens system is supposed to be made of thin thickness lenses and the focal length of said thin thickness lens system is 1, each of the aberrations (spherical aberration, coma, astigmatism, distortion) will be expressed by the following formula, as reviewed within a scope of tertiary (3rd-order) aberrations. (For example, refer to the formula shown in page 126 (April, 1962) of "Designing a Lens" written by Yoshiya Matsui (published by Kyoritsu Printing Co., Ltd.):

Spherical aberration $I = a_1 A_0 + b_1 B_0 + C_1$
Coma $II = a_2 A_0 + b_2 B_0 + C_2$ Astigmatism III = $a_3A_0 + b_3B_0 + C_3$
Distortion V = $a_5A_0 + b_5B_0 + C_5$ In the above formula, $A_0$ and $B_0$ are determined by the shapes of lenses, and $a_1, b_1, c_1 \ldots a_5, b_5, c_5$ do not have any relationship with the shapes of lenses but are determined by paraxial relationship of front and rear of the thin thickness lens system and the medium of the same. In general $A_0$ and $B_0$ are called as "eigen coefficient", and $a_1, \ldots c_5$ are called as "characteristic coefficient".

Here, the reason why the aberrations vary when zooming or focusing is done is that the characteristic coefficient varies by the variation in the paraxial amount even if the eigen coefficient does not vary.

Since the convergent lens group (II), the divergent lens group (III), the divergent lens group (V) are fixed, while the convergent movable lens group (IV) is shifted for focusing in the zoom lens of the present invention, the characteristic coefficient by focusing does not vary at the divergent lens group (V) and the lenses closer to an image (variator, compensator, imaging lens) than that while it varies at the convergent movable lens group (IV) and the lens groups closer to an object side than that.

Since the variation in aberration takes place as the movable lens group (IV) is shifted and at a same time the aberrations of the fixed convergent lens group (II) and of the divergent lens group (III) vary, such amount of aberrations with inverse sign as being able to almost cancel the amount of variation in the aberrations generated as the lens groups are shifted can be generated from the convergent lens group (II) and the divergent lens group (III), thus satisfactory properties can be secured from infinite to a close up distance.

Now, explanations will be made on the function of cancelling the aberrations on the Example 2 to be described below.

Table 1-1
Tertiary aberration coefficient and penta
5th order spherical aberration coefficient Distance to object: infinite

| Plane No. | Zoom Position | L | T | SA | CM | AS | DS | SA(penta 5th order) |
|---|---|---|---|---|---|---|---|---|
| 1 - 4 | Wide angle | 0.010649 | −0.018598 | 0.13788 | −0.36383 | 1.51477 | −6.13588 | |
| Positive | Intermediate | 0.041651 | −0.044441 | 2.10936 | −2.73179 | 4.09264 | −6.80924 | |
| lens group (II) | Telescopic | 0.163874 | −0.070339 | 32.65217 | −15.90832 | 8.30537 | −4.67501 | |
| 5 - 8 | Wide angle | −0.015976 | 0.022325 | −0.17551 | 0.39015 | −1.62958 | 5.66346 | |
| Negative | Intermediate | −0.062487 | 0.061095 | −2.68497 | 3.19190 | −4.55680 | 7.18162 | |
| lens group (III) | Telescopic | −0.245850 | 0.099948 | −41.56255 | 19.12676 | −9.56426 | 5.16641 | |
| 9 - 12 | Wide angle | 0.007017 | −0.006351 | 0.08693 | −0.23619 | 1.07574 | −2.86905 | |
| Positive lens group | Intermediate | 0.027447 | −0.023380 | 1.32984 | −1.74889 | 2.73401 | −4.41885 | |
| (IV) for focusing | Telescopic | 0.107988 | −0.040446 | 20.58550 | −10.13420 | 5.42305 | −3.09223 | |
| 1 - 14 | Wide angle | 0.000281 | −0.001441 | 0.02827 | −0.11517 | 0.69692 | −2.80763 | |
| Positive lens group | Intermediate | 0.001100 | −0.002124 | 0.43247 | −0.71877 | 1.42236 | −2.86257 | |
| being fixed during the zooming (II to V) | Telescopic | 0.004328 | −0.002808 | 6.69455 | −3.88595 | 2.48342 | −1.69732 | |
| 1 - 35 | Wide angle | 0.000189 | 0.001471 | 0.66867 | 0.36460 | −0.11726 | −1.06017 | −342.63 |
| Total of | Intermediate | −0.000483 | 0.001655 | 0.31603 | 0.30047 | 0.02306 | −1.65460 | −256.63 |
| entire system | Telescopic | −0.001653 | 0.001090 | 0.26899 | −0.00787 | 0.14019 | −1.94502 | −73.71 |

Table 1-2

Distance to object: 6m
Amount being pulled out: 14.4mm

| Plane No. | Zoom Position | L | T | SA | CM | AS | DS | SA(Penta, 5th order) |
|---|---|---|---|---|---|---|---|---|
| 1 - 4 | Wide angle | 0.011721 | −0.019517 | 0.16782 | −0.36125 | 1.40148 | −5.52570 | |
| Positive | Intermediate | 0.045843 | −0.047960 | 2.56730 | −3.00584 | 4.14313 | −6.54010 | |
| lens group (II) | Telescopic | 0.180366 | −0.076465 | 39.74094 | −18.10685 | 8.87372 | −4.73931 | |
| 5 - 8 | Wide angle | −0.017924 | 0.024185 | −0.21942 | 0.38943 | −1.53438 | 5.24319 | |
| Negative | Intermediate | −0.070106 | 0.067682 | −3.35679 | 3.60589 | −4.71670 | 7.05416 | |
| lens group (III) | Telescopic | −0.275828 | 0.111274 | −51.96204 | 22.39911 | −10.49874 | 5.37292 | |
| 9 - 12 | Wide angle | 0.007970 | −0.008340 | 0.10370 | −0.22811 | 1.08208 | −3.29303 | |
| Positive lens group | Intermediate | 0.031175 | −0.027683 | 1.58636 | −1.87645 | 2.79988 | −4.56382 | |
| (IV) for focusing | Telescopic | 0.122655 | −0.047067 | 24.55631 | −11.26359 | 5.74672 | −3.21358 | |
| 1 - 14 | Wide angle | 0.000358 | −0.002489 | 0.03106 | −0.10523 | 0.68517 | −3.04170 | |
| Positive lens group | Intermediate | 0.001400 | −0.003358 | 0.47511 | −0.70638 | 1.37883 | −2.86587 | |
| (II to V) being fixed during the zooming | Telescopic | 0.005509 | −0.004229 | 7.35463 | −3.94153 | 2.44096 | −1.67647 | |
| 1 - 35 | Wide angle | 0.000266 | 0.000423 | 0.67145 | 0.37454 | −0.12901 | −1.29424 | −342.68 |
| | Intermediate | −0.000183 | 0.000421 | 0.35867 | 0.31286 | −0.02048 | −1.65789 | −261.23 |
| Total | Telescopic | −0.000472 | −0.000331 | 0.92907 | −0.06345 | 0.09773 | −1.92417 | −350.09 |

Table 1-3

Distance to object: 3m
Amount being pulled out: 34.24mm

| Plane No. | Zoom Position | L | T | SA | CM | AS | DS | SA(penta, 5th order) |
|---|---|---|---|---|---|---|---|---|
| 1 - 4 | Wide angle | 0.013634 | −0.021619 | 0.23766 | −0.39769 | 1.32661 | −4.97412 | |
| Positive | Intermediate | 0.053327 | −0.054706 | 3.63580 | −3.81133 | 4.65646 | −6.67954 | |
| lens group (II) | Telescopic | 0.209809 | −0.087864 | 56.28112 | −23.89000 | 10.80187 | −5.32088 | |
| 5 - 8 | Wide angle | −0.021330 | 0.028059 | −0.32058 | 0.43652 | −1.47770 | 4.90463 | |
| Negative | Intermediate | −0.083429 | 0.079823 | −4.90423 | 4.75017 | −5.48426 | 7.44440 | |
| lens group (III) | Telescopic | −0.328243 | 0.131698 | −75.91597 | 30.68686 | −13.28759 | 6.26791 | |
| 9 - 12 | Wide angle | 0.009380 | −0.011390 | 0.14043 | −0.22828 | 1.06445 | −3.72078 | |
| Positive lens group | Intermediate | 0.036689 | −0.034154 | 2.14837 | −2.22582 | 2.99944 | −4.77539 | |
| (IV) for focusing | Telescopic | 0.144351 | −0.056967 | 33.25606 | −14.01305 | 6.59804 | −3.49930 | |

-continued

| | | | | | | | | |
|---|---|---|---|---|---|---|---|---|
| 1 – 14 | Wide angle | 0.000275 | −0.036949 | −0.09476 | 0.64936 | −3.25643 | | |
| Positive lens group | Intermediate | 0.001076 | −0.004434 | 0.55819 | −0.71696 | 1.32416 | −2.82663 | |
| (II to V) being fixed during the zooming | Telescopic | 0.004234 | '0.005104 | 8.64064 | −4.18640 | 2.43157 | −1.64877 | |
| 1 – 35 | Wide angle | 0.000183 | −0.000854 | 0.67689 | 0.38501 | −0.16483 | −1.50897 | −342.83 |
| | Intermediate | −0.000507 | −0.000655 | 0.44175 | 0.30228 | −0.07515 | −1.61866 | −271.42 |
| Total | Telescopic | −0.001747 | −0.001205 | 2.21508 | −0.30832 | 0.08834 | −1.89647 | −959.22 |

In the Table 1-1 to Table 1-3, attention is invited to the spherical aberration (SA) when the zoom position is placed at a telescopic end, then it is revealed that SA(II) = 32.65217, SA(III) = −41.56255, SA(IV) = 20.58550, and SA(II to V) = 6.69455, while at an object distance of 6 m, SA(II) = 39.74094, SA(III) = −51.96204, SA(IV) = 24.55631, SA(II to V) = 7.35463, that is a little larger than the values at infinite state. Also concering the spherical aberration, since the amounts in minus in penta-(5th order) spherical aberration also increase, the circular spherical aberration increases somewhat in a close up distance compared to that in infinite.

Same thing can be said as to the tendency of cancellation at infinite or at a limited distance for other aberrations.

And when the compound focal distance $f_{II\text{-}III}$ of the convergent lens group (II) and the divergent lens group (III) is made smaller than minus 10 times of the focal length $f_I$ of the convergent front lens group (I) at such lens position that the focusing is done at infinite, that is the degree of divergence is intensified, the spherical aberration, astigmatism, chromatic aberration become excessively over near a very close up distance, resulting in excessive correction. Also since the effective diameter of the convergent lens group (IV) for focusing becomes large, the effect of reducing weight and size and simplification declines.

Contrary to this when said compound focal distance is made smaller than 10 times of $f_I$, that is the degree of convergence is intensified, each of said aberrations near a very close up distance becomes excessively under, resulting in insufficient correction.

Also it becomes necessary to select the focal length of the convergent lens group (IV) for focusing and the divergent rear lens group (V) to keep the mininum distance between the divergent rear lens group (V) and the lens groups positioned just behind said group (V) at an image side (for example, variator) at the smallest amount necessary, and it has a tendency to increase the amount of pulling out up to the close up distance, thus it causes increase in the total length of lens and in the diameter of front lens.

Next, to secure a further lighter weight and a lower cost, each of the lens groups (II) to (V) in the front lens group can be made by combination of some plural number of single lenses having no achromatic function.

At this time it is better to use a lens of fluorosilicate crown glass or of fluorospar for the convergent lens groups (II) and (IV) and a lens of dense lanthanum flint glass or lanthanum fling glass for the divergent lens group (III), to reduce the chromatic aberration near a telescopic end, especially the absolute value of secondary chromatic aberration and the amount of variation in focusing.

Further, the convergent lens groups (II) and (IV) as in this example are made of a biconvex lens and a meniscus positive lens having its convex plane facing to an object side with fluorosilicate crown glass or fluorspar being positioned in said order from an object side, and the divergent lens group (III) is made of two meniscus negative lenses having its convex plane facing to an object with dense lanthanum flint glass or lanthanum flint glass, while the divergent lens group (V) is made of a meniscus negative lens having its convex plane facing to an object side, further the ratio between the focal length of the convergent lens group (II) and the absolute value of focal length of the divergent lens group (III) is selected between 1 : 0.74 and 1 : 0.86, and the absolute value of the focal length of the divergent lens group (V) is so selected as being greater than 5 times of the focal length of the convergent movable lens (IV) and smaller than 7 times of the same, thereby the lens barrels can be made to have light weight, compact size, and simple structure without complicating the lens system, yet the picture image properties can be retained at a high level from infinite to close up distance and at a same time handling characteristics can be remarkably improved compared to conventional system.

As a result of above, a very compact telescopic zoom lens which has $f = 150$ to 600, F-number of 1 : 5.6 and a close up distance photographing capability of 3 m which is very short as a telephoto zoom lens in spite of its large diameter, and maintains its own high properties from infinite to close up distance, yet the total lens length is constant from infinite to close up distance, having a telescopic ratio of 0.81 to 0.82, can be realized.

Figure 7:
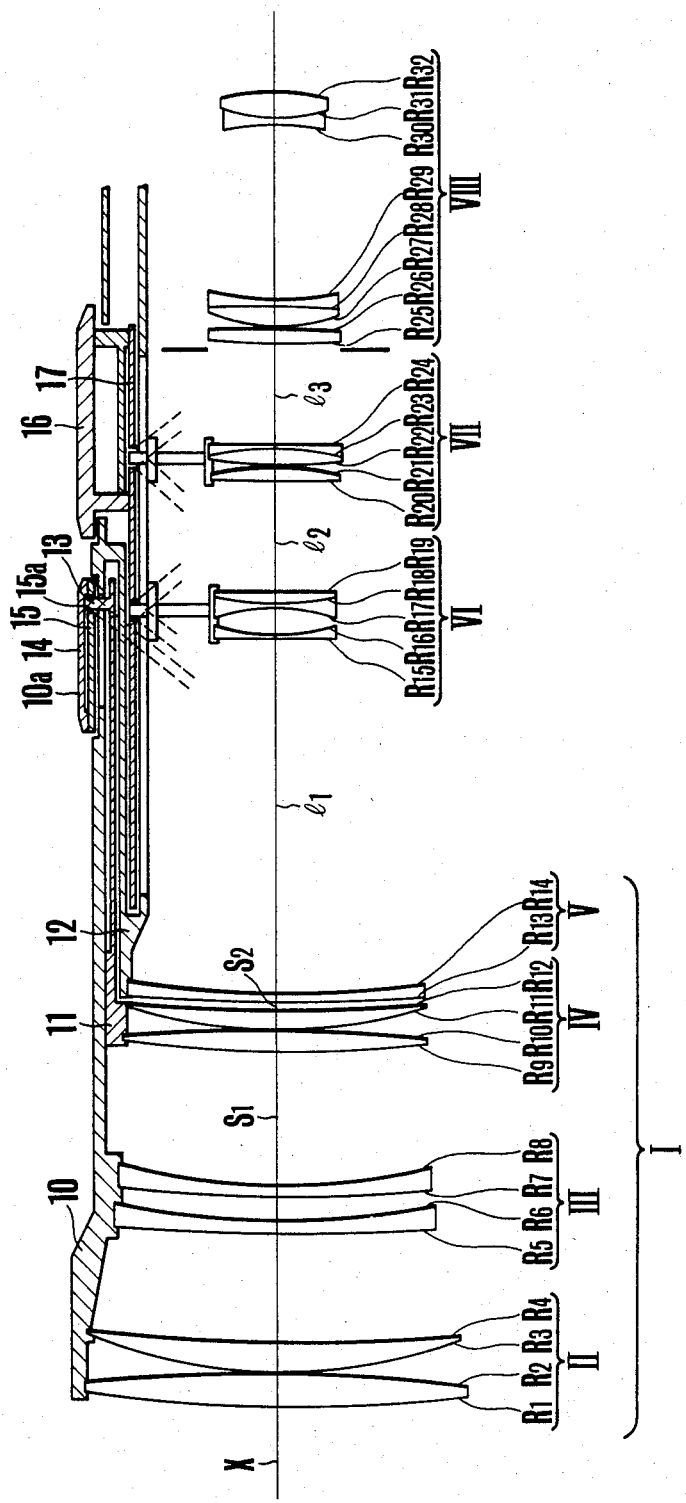
FIG. 7 is a cross-sectional view of a lens, showing Example 3.
Figure 8A:
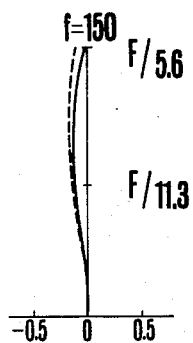
FIG. 8A to FIG. 8L are diagrams to show aberrations at a time when the zoom lens of Example 3 is focused at infinity.
Figure 8B:
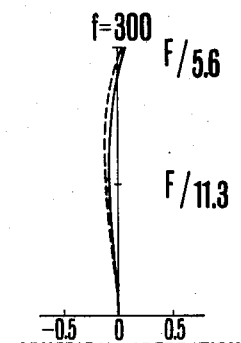
Figure 8C:
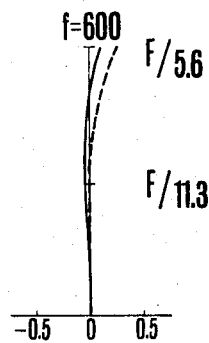
Figure 8D:
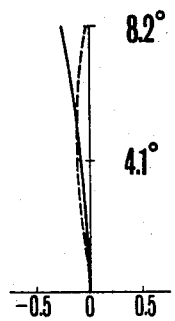
Figure 8E:
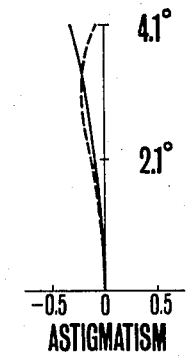
Figure 8F:
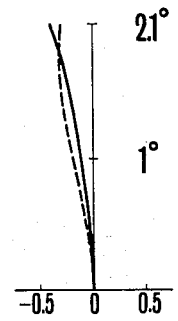
Figure 8G:
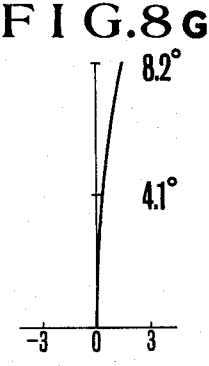
Figure 8H:
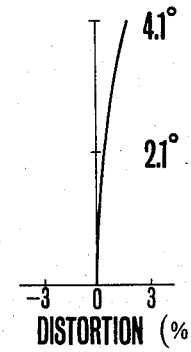
Figure 8I:
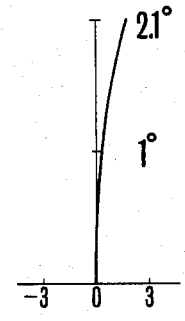
Figure 8J:
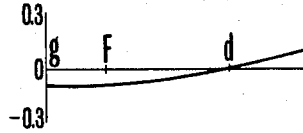
Figure 8K:
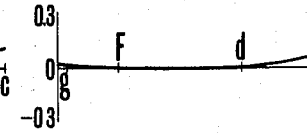
Figure 8L:
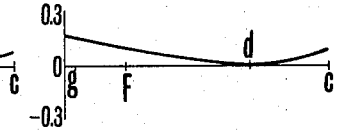
Figure 10:
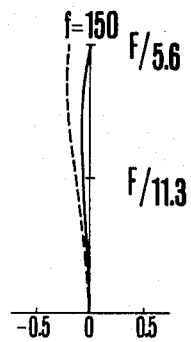
FIG. 10A to FIG. 10L are diagrams to show aberrations at a time when the zoom lens of Example 5 is focused at infinity.
Figure 10:
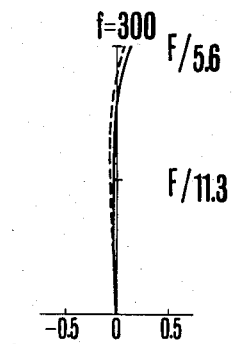
Figure 10:
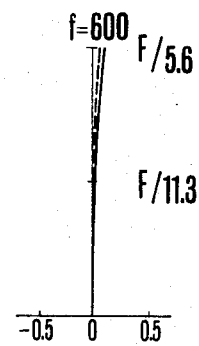
Figure 10:
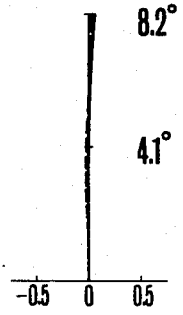
Figure 10:
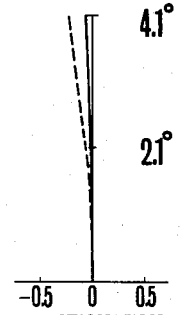
Figure 10:
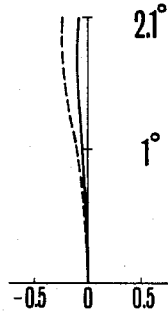
Figure 10:
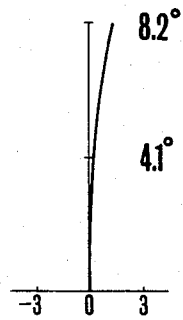
Figure 10:
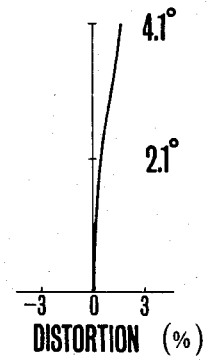
Figure 10:
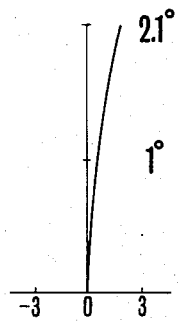
Figure 10:
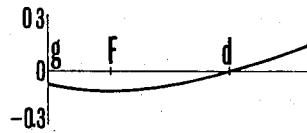
Figure 10:
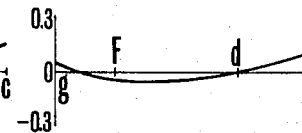
Figure 10:
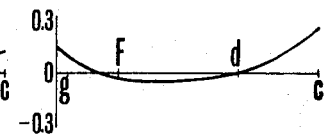

Now, the examples of the present invention shall be described, and Example 1 corresponds to FIG. 1, while FIG. 2 shows its various aberrations diagram (spherical aberration, sine condition, astigmatism, distortion, axial chromatic aberration). Also Example 2 corresponds to FIG. 3, and FIG. 4, FIG. 5 and FIG. 6 are aberrations diagrams for infinite, and of an object distance of 6 m, and of 3 m, respectively. Example 3 corresponds to FIG. 7, and FIG. 8 shows aberration diagrams. Also for Examples 4, 5 and 6, aberrations only are shown in FIGS. 9, 10 and 11, respectively.

Example 1 f = 150 – 600
F-number = 1 : 5.6
Telescopic ratio : 0.82

| Radius of curvature | | Lens thickness and distance | | Refractive index(Nd) | | Abbe No.(υd) | |
|---|---|---|---|---|---|---|---|
| R1 | 340.018 | D1 | 8.4 | N1 | 1.48749 | υ 1 | 70.1 |
| R2 | −620.976 | D2 | 0.2 | | | | |
| R3 | 143.82 | D3 | 8.25 | N2 | 1.48749 | υ 2 | 70.1 |
| R4 | 383.519 | D4 | 29.02 | | | | |
| R5 | 1280.48 | D5 | 4.3 | N3 | 1.7859 | υ 3 | 44.1 |
| R6 | 222.537 | D6 | 3.91 | | | | |
| R7 | 517.11 | D7 | 4.3 | N4 | 1.8061 | υ 4 | 40.9 |

Example 1-continued f = 150 — 600
F-number = 1 : 5.6
Telescopic ratio : 0.82

| Radius of curvature | | Lens thickness and distance | | Refractive index(Nd) | | Abbe No.(νd) | |
|---|---|---|---|---|---|---|---|
| R8  | 188.34   | S1  | 39.67 |     |         |     |      |
| R9  | 314.5    | D8  | 7.14  | N5  | 1.497   | ν5  | 81.3 |
| R10 | −476.09  | D9  | 0.2   |     |         |     |      |
| R11 | 156.967  | D10 | 6.21  | N6  | 1.497   | ν6  | 81.3 |
| R12 | 467.72   | S2  | 3.    |     |         |     |      |
| R13 | 584.81   | D11 | 4.    | N7  | 1.51633 | ν7  | 64.1 |
| R14 | 304.08   | 11  |       |     |         |     |      |
| R15 | −729.46  | D12 | 1.5   | N8  | 1.6425  | ν8  | 58.4 |
| R16 | 59.89    | D13 | 8.1   |     |         |     |      |
| R17 | −64.992  | D14 | 1.5   | N9  | 1.6425  | ν9  | 58.4 |
| R18 | 64.283   | D15 | 4.04  | N10 | 1.80518 | ν10 | 25.4 |
| R19 | 2448.4   | 12  |       |     |         |     |      |
| R20 | 475.05   | D16 | 4.41  | N11 | 1.60311 | ν11 | 60.7 |
| R21 | −75.81   | D17 | 0.2   |     |         |     |      |
| R22 | 126.668  | D18 | 5.29  | N12 | 1.48749 | ν12 | 70.1 |
| R23 | −78.138  | D19 | 1.5   | N13 | 1.834   | ν13 | 37.2 |
| R24 | ∞        | 13  |       |     |         |     |      |
| R25 | 160.287  | D20 | 2.76  | N14 | 1.48749 | ν14 | 70.1 |
| R26 | −304.29  | D21 | 3.65  |     |         |     |      |
| R27 | 49.894   | D22 | 6.52  | N15 | 1.497   | ν15 | 81.3 |
| R28 | −268.81  | D23 | 2.    | N16 | 1.59551 | ν16 | 39.2 |
| R29 | 77.01    | D24 | 41.47 |     |         |     |      |
| R30 | −286.4   | D25 | 1.5   | N17 | 1.53375 | ν17 | 55.5 |
| R31 | 82.792   | D26 | 2.19  |     |         |     |      |
| R32 | 179.666  | D27 | 1.5   | N18 | 1.79952 | ν18 | 42.2 |
| R33 | 36.136   | D28 | 4.55  | N19 | 1.62004 | ν19 | 36.3 |
| R34 | −119.715 |     |       |     |         |     |      |

|    | f = 150 | f = 300 | f = 600 |
|----|---------|---------|---------|
| 11 | 2.413   | 100.624 | 150.433 |
| 12 | 41.994  | 29.69   | 5.212   |
| 13 | 116.21  | 30.3    | 4.97    |

Example 2 f = 150 — 600
F-number = 1 : 5.6
Telescopic ratio : 0.82

| Radius of curvature | | Lens thickness and distance | | Refractive index (Nd) | | Abbe No. (νd) | |
|---|---|---|---|---|---|---|---|
| R1  | 342.83   | D1  | 8.21  | N1  | 1.48749 | ν1  | 70.1 |
| R2  | −659.02  | D2  | 0.2   |     |         |     |      |
| R3  | 142.563  | D3  | 8.19  | N2  | 1.497   | ν2  | 81.3 |
| R4  | 379.93   | D4  | 30.86 |     |         |     |      |
| R5  | 1244.89  | D5  | 3.5   | N3  | 1.7859  | ν3  | 44.1 |
| R6  | 221.79   | D6  | 6.31  |     |         |     |      |
| R7  | 506.57   | D7  | 3.5   | N4  | 1.7859  | ν4  | 44.1 |
| R8  | 184.013  | S1  | 38.52 |     |         |     |      |
| R9  | 328.07   | D8  | 6.86  | N5  | 1.497   | ν5  | 81.3 |
| R10 | −475.08  | D9  | 0.2   |     |         |     |      |
| R11 | 160.086  | D10 | 6.15  | N6  | 1.497   | ν6  | 81.3 |
| R12 | 541.485  | S2  | 2.    |     |         |     |      |
| R13 | 514.7    | D11 | 3.    | N7  | 1.5163  | ν7  | 64.1 |
| R14 | 281.96   | 11  |       |     |         |     |      |
| R15 | −827.66  | D12 | 1.5   | N8  | 1.6425  | ν8  | 58.4 |
| R16 | 60.371   | D13 | 8.09  |     |         |     |      |
| R17 | −65.481  | D14 | 1.5   | N9  | 1.6425  | ν9  | 58.4 |
| R18 | 64.303   | D15 | 4.28  | N10 | 1.8051  | ν10 | 25.4 |
| R19 | 1404.9   | 12  |       |     |         |     |      |
| R20 | 527.33   | D16 | 4.61  | N11 | 1.6031  | ν11 | 60.7 |
| R21 | 77.35    | D17 | 0.2   |     |         |     |      |
| R22 | 126.845  | D18 | 5.33  | N12 | 1.48749 | ν12 | 70.1 |
| R23 | −81.459  | D19 | 1.5   | N13 | 1.834   | ν13 | 37.2 |
| R24 | −5600.   | 13  |       |     |         |     |      |
| R25 | 160.766  | D20 | 4.    | N14 | 1.48749 | ν14 | 70.1 |
| R26 | −326.67  | D21 | 1.    |     |         |     |      |
| R27 | 49.852   | D22 | 6.51  | N15 | 1.497   | ν15 | 81.3 |
| R28 | −250.05  | D23 | 2.    | N16 | 1.59551 | ν16 | 39.2 |
| R29 | 75.885   | D24 | 43.03 |     |         |     |      |
| R30 | −225.6   | D25 | 1.5   | N17 | 1.53375 | ν17 | 55.5 |
| R31 | 93.124   | D26 | 1.84  |     |         |     |      |
| R32 | 176.451  | D27 | 1.5   | N18 | 1.79952 | ν18 | 42.2 |
| R33 | 36.268   | D28 | 4.78  | N19 | 1.62004 | ν19 | 36.3 |
| R34 | −117.14  |     |       |     |         |     |      |

|    | f = 150 | f = 300 | f = 600 |
|----|---------|---------|---------|
| 11 | 1.025   | 99.236  | 149.045 |
| 12 | 41.72   | 29.416  | 4.938   |
| 13 | 114.796 | 28.889  | 3.558   |

Example 3 f = 150 − 600
F-number = 1 : 5.6
Telescopic ratio : 0.81

| Radius of curvature | | Lens thickness and distance | | Refractive index (Nd) | | Abbe No. (υd) | |
|---|---|---|---|---|---|---|---|
| R1 | 406.814 | D1 | 9 | N1 | 1.48749 | υ1 | 70.1 |
| R2 | −551.407 | D2 | 0.2 | | | | |
| R3 | 143.477 | D3 | 7.7 | N2 | 1.497 | υ2 | 81.3 |
| R4 | 411.038 | D4 | 31.3 | | | | |
| R5 | 1242.6 | D5 | 3.5 | N3 | 1.7859 | υ3 | 44.1 |
| R6 | 218.21 | D6 | 6.02 | | | | |
| R7 | 415.61 | D7 | 3.5 | N4 | 1.7859 | υ4 | 44.1 |
| R8 | 182.256 | S1 | 37.2 | | | | |
| R9 | 337.9 | D8 | 5.8 | N5 | 1.497 | υ5 | 81.3 |
| R10 | −584.48 | D9 | 0.2 | | | | |
| R11 | 152.625 | D10 | 5.5 | N6 | 1.497 | υ6 | 81.3 |
| R12 | 509.52 | S2 | 2. | | | | |
| R13 | 540.33 | D11 | 3. | N7 | 1.60311 | υ7 | 60.7 |
| R14 | 301.78 | l1 | | | | | |
| R15 | −928.402 | D12 | 1.5 | N8 | 1.6968 | υ8 | 55.5 |
| R16 | 67.2 | D13 | 6.48 | | | | |
| R17 | −68.245 | D14 | 1.5 | N9 | 1.6968 | υ9 | 55.5 |
| R18 | 64.844 | D15 | 3.58 | N10 | 1.80518 | υ10 | 25.4 |
| R19 | −3589. | l2 | | | | | |
| R20 | 705.266 | D16 | 3.83 | N11 | 1.60311 | υ11 | 60.7 |
| R21 | −76.8 | D17 | 0.2 | | | | |
| R22 | 131.558 | D18 | 4.53 | N12 | 1.48749 | υ12 | 70.1 |
| R23 | −84.424 | D19 | 1.5 | N13 | 1.834 | υ13 | 37.2 |
| R24 | −2030. | l3 | | | | | |
| R25 | 199.89 | D20 | 4. | N14 | 1.60311 | υ14 | 60.7 |
| R26 | −377.69 | D21 | 0.42 | | | | |
| R27 | 49.759 | D22 | 5.72 | N15 | 1.497 | υ15 | 81.3 |
| R28 | −236.28 | D23 | 2 | N16 | 1.59551 | υ16 | 39.2 |
| R29 | 74.642 | D24 | 47.99 | | | | |
| R30 | −85.727 | D25 | 1.5 | N17 | 1.804 | υ17 | 46.6 |
| R31 | 41.137 | D26 | 8.23 | N18 | 1.59551 | υ18 | 39.2 |
| R32 | υ53.983 | | | | | | |

| | f = 150 | f = 300 | f = 600 |
|---|---|---|---|
| l1 | 0.613 | 98.824 | 148.633 |
| l2 | 42.983 | 30.679 | 6.201 |
| l3 | 114.768 | 28.861 | 3.53 |

Example 4 f = 150 − 600
F-number = 1 : 5.6
Telescopic ratio : 0.82

| Radius of curvature | | Lens thickness and distance | | Refractive index (Nd) | | Abbe No. (υd) | |
|---|---|---|---|---|---|---|---|
| R1 | 344.101 | D1 | 8.34 | N1 | 1.48749 | υ1 | 70.1 |
| R2 | −621.384 | D2 | 0.2 | | | | |
| R3 | 145.355 | D3 | 8.16 | N2 | 1.48749 | υ2 | 70.1 |
| R4 | 399.767 | D4 | 27.966 | | | | |
| R5 | 1756.358 | D5 | 4.61 | N3 | 1.7725 | υ3 | 49.7 |
| R6 | 237.941 | D6 | 4.488 | | | | |
| R7 | 470.798 | D7 | 4.49 | N4 | 1.8061 | υ4 | 40.9 |
| R8 | 181.34 | S1 | 40.03 | | | | |
| R9 | 316.069 | D8 | 8.15 | N5 | 1.43387 | υ5 | 95.1 |
| R10 | −354.921 | D9 | 0.15 | | | | |
| R11 | 145.135 | D10 | 7.07 | N6 | 1.43387 | υ6 | 95.1 |
| R12 | 465.758 | S2 | 3. | | | | |
| R13 | 714.028 | D11 | 3.9 | N7 | 1.51633 | υ7 | 64.1 |
| R14 | 336.552 | l1 | | | | | |
| R15 | −726.82 | D12 | 1.5 | N8 | 1.6425 | υ8 | 58.4 |
| R16 | 60.424 | D13 | 8.15 | | | | |
| R17 | −64.422 | D14 | 1.5 | N9 | 1.6425 | υ9 | 58.4 |
| R18 | 64.422 | D15 | 4.05 | N10 | 1.80518 | υ10 | 25.4 |
| R19 | 2507.38 | l2 | | | | | |
| R20 | 531.67 | D16 | 4.45 | N11 | 1.60311 | υ11 | 60.7 |
| R21 | −75.621 | D17 | 2. | | | | |
| R22 | 122.73 | D18 | 5.3 | N12 | 1.48749 | υ12 | 70.1 |
| R23 | −78.164 | D19 | 1.5 | N13 | 1.834 | υ13 | 37.2 |
| R24 | ∞ | l3 | | | | | |
| R25 | 158.76 | D20 | 3.35 | N14 | 1.48749 | υ14 | 70.1 |
| R26 | −297.27 | D21 | 0.4 | | | | |
| R27 | 50. | D22 | 6.5 | N15 | 1.497 | υ15 | 81.3 |
| R28 | −330. | D23 | 2. | N16 | 1.59551 | υ16 | 39.2 |
| R29 | 75.621 | D24 | 43.2 | | | | |
| R30 | −256.47 | D25 | 1.5 | N17 | 1.53375 | υ17 | 55.5 |
| R31 | 88.509 | D26 | 2.15 | | | | |
| R32 | 181.98 | D27 | 1.5 | N18 | 1.79952 | υ18 | 42.2 |
| R33 | 35.701 | D28 | 4.9 | N19 | 1.62004 | υ19 | 36.3 |
| R34 | −121.94 | | | | | | |

| | f = 150 | f = 300 | f = 600 |
|---|---|---|---|
| l1 | 1.626 | 99.837 | 149.645 |
| l2 | 42.023 | 29.719 | 5.242 |

Example 4-continued f = 150 — 600
F-number = 1 : 5.6
Telescopic ratio : 0.82

| Radius of curvature | | Lens thickness and distance | | Refractive index (Nd) | | Abbe No. ($\nu d$) | |
|---|---|---|---|---|---|---|---|
| | | 13 | 115.327 | | 29.419 | 4.089 | |

Example 5 f = 150 — 600
F-number = 1 : 5.6
Telescopic ratio : 0.82

| Radius of curvature | | Lens thickness and distance | | Refractive index (Nd) | | Abbe No. ($\nu d$) | |
|---|---|---|---|---|---|---|---|
| R1 | 340.018 | D1 | 8.4 | N1 | 1.48749 | $\nu$ 1 | 70.1 |
| R2 | −620.976 | D2 | 0.2 | | | | |
| R3 | 143.82 | D3 | 8.25 | N2 | 1.48749 | $\nu$ 2 | 70.1 |
| R4 | 383.519 | D4 | 29.02 | | | | |
| R5 | 1280.48 | D5 | 4.3 | N3 | 1.8061 | $\nu$ 3 | 40.9 |
| R6 | 227.437 | D6 | 3.91 | | | | |
| R7 | 370. | D7 | 4.3 | N4 | 1.8061 | $\nu$ 4 | 40.9 |
| R8 | 183.549 | S1 | 39.67 | | | | |
| R9 | 372.5889 | D8 | 7.14 | N5 | 1.497 | $\nu$ 5 | 81.3 |
| R10 | −570. | D9 | 0.2 | | | | |
| R11 | 156.967 | D10 | 6.21 | N6 | 1.497 | $\nu$ 6 | 81.3 |
| R12 | 467.72 | S2 | 0.5 | | | | |
| R13 | 584.81 | D11 | 2. | N7 | 1.51633 | $\nu$ 7 | 64.1 |
| R14 | 304.076 | 11 | | | | | |
| R15 | −729.46 | D12 | 1.5 | N8 | 1.6425 | $\nu$ 8 | 58.4 |
| R16 | 59.89 | D13 | 8.1 | | | | |
| R17 | −64.992 | D14 | 1.5 | N9 | 1.6425 | $\nu$ 9 | 58.4 |
| R18 | 64.283 | D15 | 4.04 | N10 | 1.80518 | $\nu$10 | 25.4 |
| R19 | 2448.36 | 12 | | | | | |
| R20 | 475.05 | D16 | 4.41 | N11 | 1.60311 | $\nu$11 | 60.7 |
| R21 | −75.81 | D17 | 0.2 | | | | |
| R22 | 126.668 | D18 | 5.29 | N12 | 1.48749 | $\nu$12 | 70.1 |
| R23 | −78.138 | D19 | 1.5 | N13 | 1.834 | $\nu$13 | 37.2 |
| R24 | ∞ | 13 | | | | | |
| R25 | 160.287 | D20 | 2.76 | N14 | 1.48749 | $\nu$14 | 70.1 |
| R26 | −304.29 | D21 | 3.65 | | | | |
| R27 | 49.894 | D22 | 6.52 | N15 | 1.497 | $\nu$15 | 81.3 |
| R28 | −268.81 | D23 | 2. | N16 | 1.59551 | $\nu$16 | 39.2 |
| R29 | 77.01 | D24 | 41.47 | | | | |
| R30 | −286.4 | D25 | 1.5 | N17 | 1.53375 | $\nu$17 | 55.5 |
| R31 | 82.792 | D26 | 2.19 | | | | |
| R32 | 179.666 | D27 | 1.5 | N18 | 1.79952 | $\nu$18 | 42.2 |
| R33 | 36.136 | D28 | 4.55 | N19 | 1.62004 | $\nu$19 | 36.3 |
| R34 | −119.715 | | | | | | |

| | f = 150 | f = 300 | f = 600 |
|---|---|---|---|
| 11 | 1.107 | 99.318 | 149.127 |
| 12 | 41.994 | 29.69 | 5.212 |
| 13 | 116.208 | 30.3 | 4.969 |

Example 6 f = 150 — 600
F-number = 1 : 5.6
Telescopic ratio : 0.82

| Radius of curvature | | Lens thickness and distance | | Refractive index (Nd) | | Abbe No. ($\nu d$) | |
|---|---|---|---|---|---|---|---|
| R1 | 356.912 | D1 | 8.66 | N1 | 1.497 | $\nu$ 1 | 81.3 |
| R2 | −721.827 | D2 | 0.2 | | | | |
| R3 | 142.297 | D3 | 9.78 | N2 | 1.43387 | $\nu$ 2 | 95.1 |
| R4 | 497.1705 | D4 | 31.24 | | | | |
| R5 | 1493.272 | D5 | 3.88 | N3 | 1.757 | $\nu$ 3 | 47.9 |
| R6 | 218.712 | D6 | 6.74 | | | | |
| R7 | 510.73 | D7 | 3.84 | N4 | 1.757 | $\nu$ 4 | 47.9 |
| R8 | 182.826 | S1 | 40.21 | | | | |
| R9 | 311.378 | D8 | 6.86 | N5 | 1.497 | $\nu$ 5 | 81.3 |
| R10 | −477.896 | D9 | 0.2 | | | | |
| R11 | 155.414 | D10 | 6.15 | N6 | 1.497 | $\nu$ 6 | 81.3 |
| R12 | 474.802 | S2 | 2. | | | | |
| R13 | 608.807 | D11 | 3. | N7 | 1.51633 | $\nu$ 7 | 64.1 |
| R14 | 315.398 | 11 | | | | | |
| R15 | −827.66 | D12 | 1.5 | N8 | 1.6425 | $\nu$ 8 | 58.4 |
| R16 | 60.371 | D13 | 8.09 | | | | |
| R17 | −65.481 | D14 | 1.5 | N9 | 1.6425 | $\nu$ 9 | 58.4 |
| R18 | 64.303 | D15 | 4.28 | N10 | 1.80518 | $\nu$10 | 25.4 |
| R19 | 1404.8506 | 12 | | | | | |
| R20 | 527.33 | D16 | 4.61 | N11 | 1.60311 | $\nu$11 | 60.7 |
| R21 | −77.35 | D17 | 0.2 | | | | |
| R22 | 126.845 | D18 | 5.33 | N12 | 1.48749 | $\nu$12 | 70.1 |
| R23 | −81.459 | D19 | 1.5 | N13 | 1.834 | $\nu$13 | 37.2 |
| R24 | ∞ | 13 | | | | | |
| R25 | 160.766 | D20 | 4. | N14 | 1.48749 | $\nu$14 | 70.1 |
| R26 | −326.67 | D21 | 1. | | | | |
| R27 | 49.852 | D22 | 6.51 | N15 | 1.497 | $\nu$15 | 81.3 |

Example 6-continued f = 150 – 600
F-number = 1 : 5.6
Telescopic ratio : 0.82

| Radius of curvature | | Lens thickness and distance | | Refractive index (Nd) | | Abbe No. (υd) | |
|---|---|---|---|---|---|---|---|
| R28 | −250.05 | D23 | 2. | N16 | 1.59551 | υ16 | 39.2 |
| R29 | 75.885 | D24 | 43.03 | | | | |
| R30 | −225.6 | D25 | 1.5 | N17 | 1.53375 | υ17 | 55.5 |
| R31 | 93.124 | D26 | 1.84 | | | | |
| R32 | 176.451 | D27 | 1.5 | N18 | 1.79952 | υ18 | 42.2 |
| R33 | 36.268 | D28 | 4.78 | N19 | 1.62004 | υ19 | 36.3 |
| R34 | −117.137 | | | | | | |

| | f = 150 | f = 300 | f = 600 |
|---|---|---|---|
| l1 | 0.49 | 98.701 | 148.509 |
| l2 | 41.72 | 29.416 | 4.938 |
| l3 | 114.796 | 28.889 | 3.558 |

Kind of glass in the Examples of the lenses (II), (III), (IV) within the convergent front lens group (I)

| Fluorosilicate crown | FK |
|---|---|
| Dense lanthanum flint | LaSF |
| Lanthanum flint | LaF |
| Fluorspar | CaF$_2$ |

| | | Ex. 1 | Ex. 2 | Ex. 3 | Ex. 4 | Ex. 5 | Ex. 6 |
|---|---|---|---|---|---|---|---|
| Lens group (II) | G1 | FK | FK | FK | FK | FK | FK |
| | G2 | FK | FK | FK | FK | FK | CaF$_2$ |
| Lens group (III) | G3 | LaSF | LaSF | LaSF | LaSF | LaSF | LaF |
| | G4 | LaSF | LaSF | LaSF | LaSF | LaSF | LaF |
| Lens group (IV) | G5 | FK | FK | FK | CaF$_2$ | FK | FK |
| | G6 | FK | FK | FK | CaF$_2$ | FK | FK |

What is claimed is:

1. A telephoto zoom lens comprising:
a convergent front lens group, a zooming lens part and an image forming lens group positioned in said order from an object side, wherein said convergent front lens group consists of a convergent first sub-group, a divergent second sub-group, a convergent third sub-group and a divergent fourth sub-group, further wherein said convergent third sub-group can be shifted for focusing and the ratio between the focal length ($f_{II}$) of said convergent first sub-group and the absolute value ($|f_{III}|$) of the focal length of said divergent second sub-group lies between 1 : 0.65 and 1 : 0.9, and the absolute value ($|f_V|$) of the focal length of said divergent fourth sub-group is greater than the focal length ($f_{IV}$) of said convergent third sub-group, said zooming lens part consisting of at least two movable lens groups.

2. A telephoto zoom lens according to claim 1, in which the compound focal length of said convergent first sub-group and said divergent second sub-group is greater than 10 times of the focal length of said convergent front lens group at a time the total system is focused at infinite.

3. A telephoto zoom lens according to claim 2, in which said first sub-group consists of positive lenses, and said second sub-group consists of negative lenses.

4. A telephoto zoom lens according to claim 3, in which said first sub-group contains a lens of fluorosilicate crown glass, and said second sub-group contains a lens of dense lanthanum flint glass.

5. A telephoto zoom lens according to claim 3, in which said first sub-group contains a lens of fluorite and said second sub-group contains a lens of lanthanum flint glass.

6. A telephoto zoom lens according to claim 3, in which said first sub-group contains a lens of fluorosilicate crown glass, and said second sub-group contains a lens of lanthanum flint glass.

7. A telephoto zoom lens according to claim 1, in which said third sub-group contains a positive lens of fluorosilicate crown glass.

8. A telephoto zoom lens according to claim 1, in which said third sub-group contains a positive lens of fluorite.

9. A telephoto zoom lens according to claim 1, in which said first sub-group consists of a plurality of positive lenses, and said second sub-group consists of a plurality of negative lenses, while said third sub-group consists of a plurality of positive lenses.

10. A telephoto zoom lens according to claim 9, in which the material of said positive lenses is fluorosilicate crown glass and the material of said negative lenses is dense lanthanum flint glass.

11. A telephoto zoom lens according to claim 9, in which the material of at least one of said positive lenses is fluorite.

12. A telephoto zoom lens, consisting of:
a front lens part, having a Galilean telescopic lens group, a movable lens group and a fixed lens group in said order from an object side, further having a positive refractive power, wherein said movable lens part has a positive refractive power and can be shifted for focusing, and said Galilean telescopic lens group contains a plurality of positive lenses of fluorosilicate crown glass and the absolute value of the focal length thereof is greater than 10 times of the focal length of said front lens part at a time when said movable lens group is at an object side end within its shifting zone;
a zooming lens part including a variation lens group and a compensation lens group, and being positioned in the rear of said front part; and
a prime lens part consisting of a plurality of lenses and being positioned in the rear of said zooming lens part.

* * * * *